United States Patent
Jung et al.

(10) Patent No.: US 9,715,120 B2
(45) Date of Patent: Jul. 25, 2017

(54) OPTICAL MODULATION DEVICE INCLUDING A LIQUID CRYSTAL AND AN OPTICAL DISPLAY DEVICE USING THE SAME

(71) Applicant: SAMSUNG DISPLAY CO., LTD., Yongin, Gyeonggi-do (KR)

(72) Inventors: Kyung Ho Jung, Gyeonggi-do (KR); Hyun Seung Seo, Gyeonggi-do (KR); Chun Ki Choi, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 167 days.

(21) Appl. No.: 14/818,405

(22) Filed: Aug. 5, 2015

(65) Prior Publication Data

US 2016/0202490 A1    Jul. 14, 2016

(30) Foreign Application Priority Data

Jan. 12, 2015   (KR) ........................ 10-2015-0004337

(51) Int. Cl.

| | |
|---|---|
| *G02B 27/22* | (2006.01) |
| *G02F 1/1337* | (2006.01) |
| *G02F 1/29* | (2006.01) |
| *G02F 1/1343* | (2006.01) |

(52) U.S. Cl.
CPC ..... *G02B 27/225* (2013.01); *G02F 1/134309* (2013.01); *G02F 1/29* (2013.01); *G02F 2001/133776* (2013.01); *G02F 2001/294* (2013.01)

(58) Field of Classification Search
CPC ........ G02B 27/225; G02F 1/29; G02F 1/1337
See application file for complete search history.

(56) References Cited

U.S. PATENT DOCUMENTS

2009/0073331 A1   3/2009  Shi et al.

FOREIGN PATENT DOCUMENTS

| JP | 2010170068 | 8/2010 |
|---|---|---|
| KR | 1020110059169 | 6/2011 |
| KR | 1020120107876 | 10/2012 |
| KR | 1020140028475 | 3/2014 |

OTHER PUBLICATIONS

Lei Shi et al. "Liquid crystal optical phase plate with a variable in-plane gradient", Journal of Applied Physics 104, 033109-1~7 (2008).

*Primary Examiner* — Joseph L Williams
(74) *Attorney, Agent, or Firm* — F. Chau & Associates, LLC

(57) ABSTRACT

An optical modulation device, according to an exemplary embodiment of the present invention, includes first and second plates facing each other, the first and second plates including a plurality of regions, and a liquid crystal layer interposed between the first and second plates, the liquid crystal layer including liquid crystal molecules aligned in a vertical alignment (VA) mode. The first plate includes a non-conductive layer including stepped structures repeatedly arranged in a first direction, a first electrode formed to partially cover the non-conductive layer, and first and second aligners disposed in a second direction different from the first direction, wherein the first and second aligners are aligned in opposite directions with respect to each other. The second plate includes a second electrode.

20 Claims, 15 Drawing Sheets

OPTICAL MODULATION DEVICE INCLUDING A LIQUID CRYSTAL AND AN OPTICAL DISPLAY DEVICE USING THE SAME

CROSS-REFERENCE TO RELATED APPLICATION(S)

This application claims priority under 35 U.S.C. §119 to Korean Patent Application No. 10-2015-0004337, filed on Jan. 12, 2015, in the Korean Intellectual Property Office, the disclosure of which is incorporated by reference herein in its entirety.

TECHNICAL FIELD

Exemplary embodiments of the present invention relate to an optical modulation device and an optical display device using the same, and more particularly, to an optical modulation device including liquid crystals and an optical display device using the same.

DISCUSSION OF THE RELATED ART

Optical display devices may use optical modulation devices for modulating characteristics of light. For example, in an optical display device for displaying a three-dimensional (3D) image, an optical modulation device may be used to divide an image with different viewpoints to be transmitted so that a viewer can perceive the image as a stereoscopic image. Optical modulation devices that can be used in an autostereoscopic 3D image display device may include lenses, prisms, or the like. The optical modulation devices may alter a path of light to transmit the image of the display device to a desired viewpoint.

For example, a direction of incident light can be altered by diffracted light that has been phase modulated.

When polarized light passes through an optical modulation device such as a phase retarder, its polarization state may be changed. For example, when circularly polarized light is incident on a half-wave plate, the circularly polarized light is emitted with its rotation direction inversed. For example, when left circularly polarized light passes through the half-wave plate, right circularly polarized light may be emitted. In this case, a phase of the circularly polarized light may be changed according to an optical axis of the half-wave plate. The optical axis of the half-wave plate may be, for example, a slow axis. When the optical axis of the half-wave plate is rotated in-plane by $\phi$, (e.g., a first angle), a phase of the outputted light may be changed by $2\phi$, (e.g., a second angle that is twice the magnitude of the first angle). Thus, when the optical axis of the half-wave plate is spatially rotated in a x-axis direction by 180° (e.g., $\pi$ radians), the emitted light may have a phase modulation or a shift of 360° (e.g., $2\pi$ radians) in the x-axis direction. In addition, when the optical modulation device causes the phase shift of 0 radians to $2\pi$ radians depending on a location along the optical modulation device, a diffraction grating or prism for altering or diffracting the transmitted light can be used.

Liquid crystals may be used to adjust the optical axis of an optical modulation device such as the half-wave plate according to an arrangement (e.g., alignment) of the liquid crystal molecules. When the optical modulation device is used as a phase retarder that uses liquid crystals, long axes of the liquid crystal molecules, which may be arranged by applying an electric field to a liquid crystal layer, may be rotated to cause different phase modulations according to their arrangement. The phase of the light emitted after passing through the optical modulation device may be determined by the direction of the long axes of the aligned liquid crystals, for example, an azimuthal angle.

To implement a prism, diffraction grating, lens, or the like, using an optical modulation device that uses liquid crystals to obtain continuous phase modulation, liquid crystal molecules may be aligned such that directions of their long axes are continuously changed. For emitted light to have a phase profile that changes from 0 radians to $2\pi$ radians, a half-wave plate may have an optical axis that changes from 0 radians to $\pi$ radians. Accordingly, after performing alignment processing and combining electrode patterns in different directions, different voltages may be applied. This, however, may complicate display driving. Further, a desired light deflection angle may not be obtained due to minute electrode patterns used in the manufacturing of the display device.

SUMMARY

According to an exemplary embodiment of the present invention, an optical modulation device may adjust an in-plane rotation angle of liquid crystal molecules to modulate a phase of light and simplify a driving scheme.

According to an exemplary embodiment of the present invention, a manufacturing process of an optical modulation device including liquid crystals may be simplified and the diffraction efficiency of the optical modulation device may be increased.

According to an exemplary embodiment of the present invention, a display device that uses an optical modulation device including liquid crystals may have a simplified manufacturing process.

An optical modulation device, according to an exemplary embodiment of the present invention, includes first and second plates facing each other, the first and second plates including a plurality of regions, and a liquid crystal layer interposed between the first and second plates, the liquid crystal layer including liquid crystal molecules aligned in a vertical alignment (VA) mode. The first plate includes a non-conductive layer including stepped structures repeatedly arranged in a first direction, a first electrode formed to partially cover the non-conductive layer, and first and second aligners disposed in a second direction different from the first direction, wherein the first and second aligners are aligned in opposite directions with respect to each other. The second plate includes a second electrode.

According to an exemplary embodiment of the present invention, when an electric field is applied, a first lateral side of at least one of the stepped structures may align the liquid crystal molecules in a positive first direction, and a second lateral side of the at least one stepped structure may align the liquid crystal molecules in a negative first direction.

According to an exemplary embodiment of the present invention, the first aligner may align the liquid crystal molecules in a positive second direction and the second aligner may align the liquid crystal molecules in a negative second direction.

According to an exemplary embodiment of the present invention, the first electrode may be a patternless plate-shaped electrode and may be disposed in a region of the first plate that faces the liquid crystal layer.

According to an exemplary embodiment of the present invention, the second electrode may be a patternless plate-shaped electrode in a region that faces the liquid crystal layer.

According to an exemplary embodiment of the present invention, when operated in a two-dimensional (2D) mode, a reference voltage may be applied to the first and second electrodes.

According to an exemplary embodiment of the present invention, when operated in a three-dimensional (3D) mode, a lens voltage may be applied to the first electrode and a common voltage may be applied to the second electrode.

According to an exemplary embodiment of the present invention, when operated in the 3D mode, the lens voltage and the common voltage may be applied to rotate and align long axes of the liquid crystal molecules in a plane.

An optical modulation device, according to an exemplary embodiment of the present invention, includes first and second plates facing each other, the first and second plates including a plurality of regions, and a liquid crystal layer interposed between the first and second plates, the liquid crystal layer including liquid crystal molecules aligned in a vertical alignment (VA) mode. The first plate includes a non-conductive layer including stepped structures repeatedly arranged in a first direction, and a first electrode formed to partially cover the non-conductive layer. The second plate includes a second electrode. The first electrode includes first and second electrode patterns, wherein a first lateral side of the first electrode pattern faces a first lateral side of the second electrode pattern, and wherein the first lateral side of the first electrode pattern converges with the first lateral side of the second electrode pattern on a point in a second direction that crosses the first direction.

According to an exemplary embodiment of the present invention, when an electric field is applied, a first lateral side of at least one of the stepped structures may align the liquid crystal molecules in a positive first direction, and a second lateral side of the at least one stepped structure may align the liquid crystal molecules in a negative first direction.

According to an exemplary embodiment of the present invention, the first electrode pattern may cover a first lateral side of the at least one stepped structure, and the second electrode pattern may cover a second lateral side of the at least one stepped structure.

According to an exemplary embodiment of the present invention, one of each of the first and second electrode patterns may be included in a unit, wherein a plurality of units may be repeatedly arranged on the first plate, and wherein a first opening between a first electrode pattern of a first unit and a second electrode pattern of the first unit may have a shape that becomes narrower toward a negative second direction, and a second opening between the second electrode pattern of the first unit and a first electrode pattern of a second unit may have a shape that becomes narrower toward a positive second direction.

According to an exemplary embodiment of the present invention, at least a lateral side, from among the plurality of lateral sides of the first electrode pattern of the first unit, may have a negative slope with respect to the first direction, and at least a lateral side, from among the plurality of lateral sides of the second electrode pattern of the first unit, may have a positive slope with respect to the first direction.

According to an exemplary embodiment of the present invention, a first lateral side of the first electrode pattern of the first unit may have a negative slope with respect to the first direction, and a first lateral side of the second electrode pattern of the first unit may have a positive slope with respect to the first direction.

According to an exemplary embodiment of the present invention, a first lateral side of the first electrode pattern of the first unit may be perpendicular to the first direction, and a second lateral side of the second electrode pattern of the first unit may be perpendicular to the first direction.

According to an exemplary embodiment of the present invention, a first lateral side of the first electrode pattern of the first unit faces a second lateral side of the second electrode pattern of the first unit, wherein the first and second lateral sides of the first and second electrode patterns of the first unit may converge at a plurality of first points, and the first and second lateral sides of the first and second electrode patterns of the first unit may include a plurality of inclined portions that are inclined with respect to the first direction.

According to an exemplary embodiment of the present invention, a connecting electrode may be provided between the first and second electrode patterns of the first unit to electrically connect the first and second electrode patterns of the first unit, and each of the first and second openings may include a plurality of third openings formed by the connecting electrode.

According to an exemplary embodiment of the present invention, when operated in a two dimensional (2D) mode, a reference voltage may be applied to the first and second electrodes.

According to an exemplary embodiment of the present invention, when operated in a three-dimensional (3D) mode, a lens voltage may be applied to the first electrode, and a common voltage may be applied to the second electrode.

According to an exemplary embodiment of the present invention, when operated in the 3D mode, the lens voltage and the common voltage are applied to rotate and align long axes of the liquid crystal molecules in a plane.

An optical modulation device, according to an exemplary embodiment of the present invention, includes a first plate and a second plate facing each other, and a liquid crystal layer formed between the first and second plates, wherein a stepped structure extending in a first direction is disposed on the first plate, and a first electrode is disposed on the stepped structure. A second electrode is disposed on the second plate, and first and second aligners are disposed on the first plate and extend along a second direction that crosses the first direction. The first and second aligners are aligned in opposite directions with respect to each other.

According to an exemplary embodiment of the present invention, when a first voltage is applied to the first electrode, and a second voltage which is different from the first voltage is applied to the second electrode, liquid crystal molecules of the liquid crystal layer adjacent to a first lateral side of the stepped structure may be rotated in a first direction, liquid crystal molecules of the liquid crystal layer adjacent to a second lateral side of the stepped structure may be rotated in a second direction opposite to the first direction, and liquid crystal molecules of the liquid crystal layer between the stepped structure and the second electrode may be rotated and aligned in a plane.

According to an exemplary embodiment of the present invention, the first electrode includes a first electrode pattern and a second electrode pattern, wherein a first lateral side of the first electrode pattern faces a first lateral side of the second electrode pattern, and wherein the first lateral side of the first electrode pattern may converge with the first lateral side of the second electrode pattern on at least a point in the second direction.

DETAILED DESCRIPTION OF THE EMBODIMENTS

Figure 1:
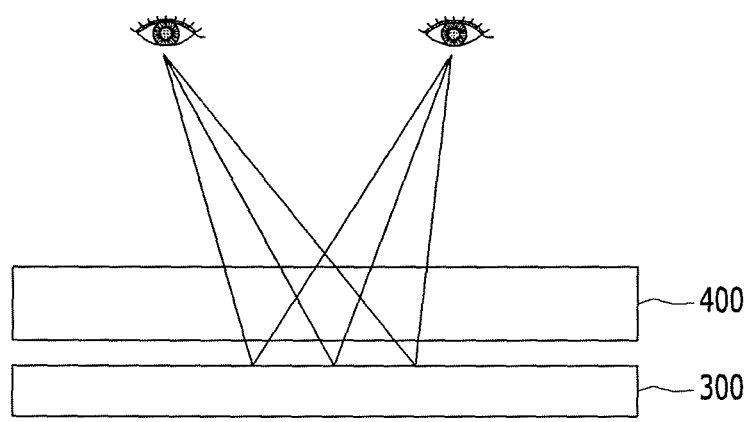
FIG. 1 is a drawing illustrating an optical display device and a method of generating a two-dimensional (2D) image, according to an exemplary embodiment of the present invention.

The present invention will be described more fully hereinafter with reference to the accompanying drawings, in which exemplary embodiments of the present invention are shown. Those skilled in the art would realize that the described embodiments may be modified in various different ways.

In the drawings, the thicknesses of layers, films, panels, regions, or the like, may be exaggerated for clarity. Like reference numerals may correspond to like elements throughout the specification. It will be understood that when an element such as a layer, film, region, or substrate is referred to as being "on" another element, it may be directly on the other element or intervening elements may be present.

Figure 2:
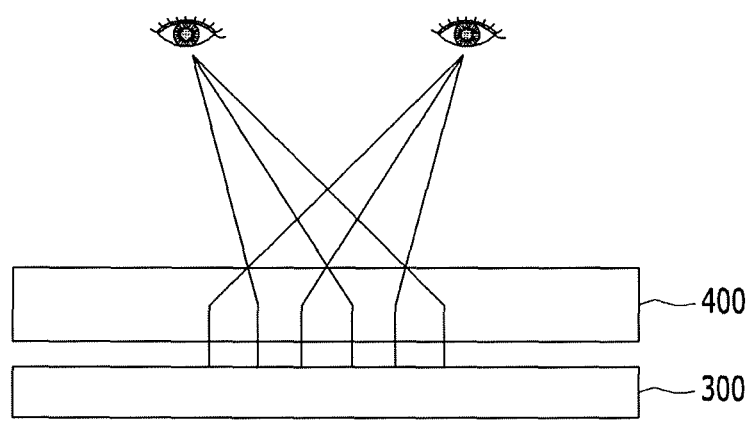
FIG. 2 is a drawing illustrating an optical display device and a method of generating a three-dimensional (3D) image, according to an exemplary embodiment of the present invention.

FIG. 1 is a drawing illustrating an optical display device and a method of generating a two-dimensional (2D) image, according to an exemplary embodiment of the present invention. FIG. 2 is a drawing illustrating an optical display device and a method of generating a three-dimensional (3D) image, according to an exemplary embodiment of the present invention.

Referring to FIGS. 1 and 2, the display device may include a display panel 300 for displaying an image, and an optical modulation device 400 positioned in front of a surface of the display panel 300 on which the image is displayed. The display panel 300 and the optical modulation device 400 may be operated in a 2D or 3D mode.

The display panel 300 may include various types of display panels such as a plasma display panel, a liquid crystal display, an organic light emitting diode display, or the like. The display panel 300 may be configured in a matrix form, and may include a plurality of pixels PX for displaying an image. The display panel 300 may display a planar image in the 2D mode. In the 3D mode, the display panel 300 may display an image corresponding to various viewing zones, such as a left eye image and a right eye image, using a spatial or temporal division method. For example, in the 3D mode, the display panel 300 may alternately display the right eye image and the left eye image in every column of pixels.

The optical modulation device 400 may be configured to operate in the 2D mode or the 3D mode to allow the displayed image to be perceived as a 2D image or a 3D image, respectively. The optical modulation device 400 may transmit the image displayed on the display panel 300 as is, (e.g., in the 2D mode). The optical modulation device 400 may separate viewing zones of the image displayed on the display panel 300 in the 3D mode. For example, the optical modulation device 400 when operated in the 3D mode may allow a multi-view image including the left eye image and the right eye image, displayed on the display panel 300, to be displayed on the corresponding viewing zones associated with each viewpoint image, using diffraction and refraction of light.

FIG. 1 illustrates a case in which the display panel 300 and the optical modulation device 400 are operated in the 2D mode, according to an exemplary embodiment of the present invention. In the 2D mode, the same image reaches a left eye and a right eye such that it may be perceived as a 2D image.

FIG. 2 illustrates a case in which the display panel 300 and the optical modulation device 400 are operated in the 3D mode, according to an exemplary embodiment of the present invention. The image of the display panel 300 may be divided according to viewing zones for the left eye and the right eye and then it may be diffracted to be perceived as a 3D image.

Figure 3:
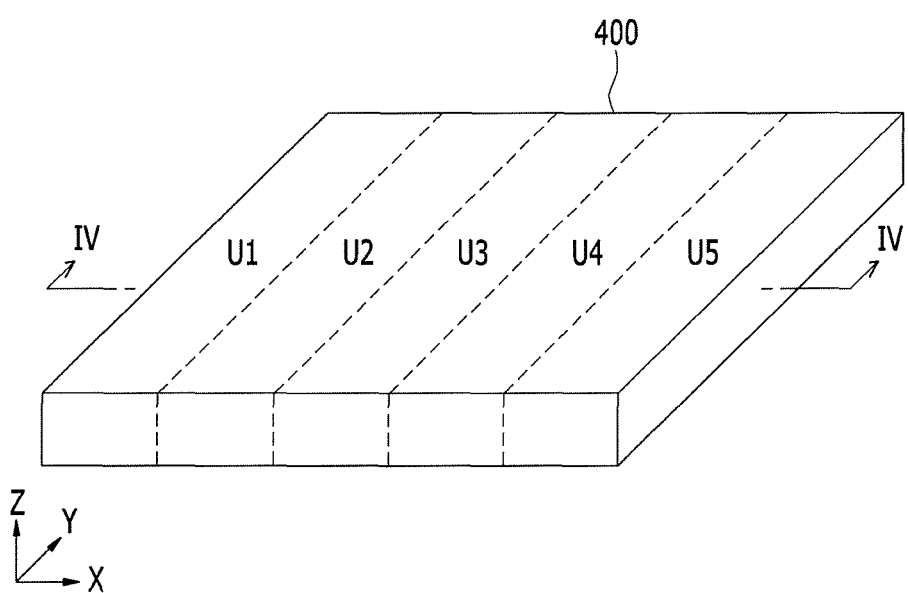
FIG. 3 is a perspective view of an optical modulation device included in the optical display device of FIGS. 1 or 2, according to an exemplary embodiment of the present invention.
Figure 4:
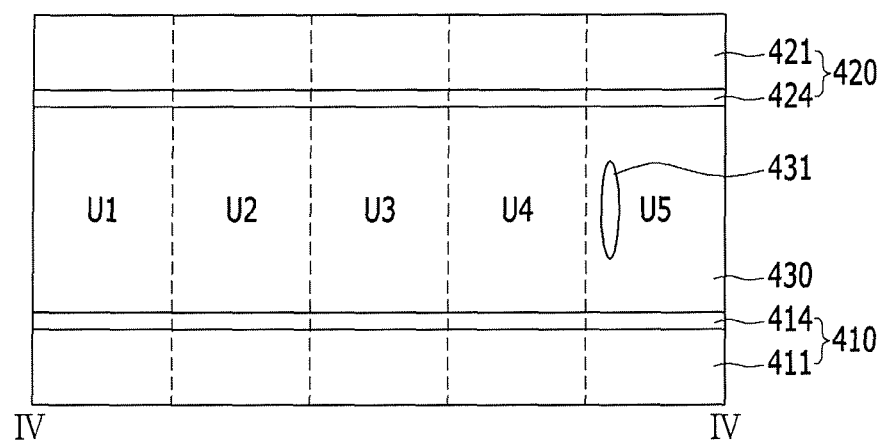
FIG. 4 is a cross-sectional view of a liquid crystal lens panel of FIG. 3 taken along line IV-IV, according to an exemplary embodiment of the present invention.

FIG. 3 is a perspective view of the optical modulation device included in the optical display device of FIGS. 1 or 2, according to an exemplary embodiment of the present invention. FIG. 4 is a cross-sectional view of a liquid crystal lens panel of FIG. 3 taken along line IV-IV, according to an exemplary embodiment of the present invention.

Referring to FIGS. 3 and 4, the optical modulation device 400 may include a plurality of unit elements U1 to U5 that may be sequentially disposed in an X-axis direction. In FIGS. 3 and 4, five unit elements are displayed. However, the present invention is not limited thereto. For example, the optical modulation device 400 may include more than five unit elements or less than five unit elements. One unit element may cover N viewpoints of the display panel 300 (e.g., N is a natural number). One viewpoint may correspond to one pixel. For example, one unit element may cover nine viewpoints. One unit element may function as one lens.

The optical modulation device 400 may include first and second plates 410 and 420, facing each other, and a liquid crystal layer 430 interposed between the two plates 410 and 420.

The first plate 410 may include a first base substrate 411 that may include glass, plastic, or the like, and a first electrode 414 formed on the first base substrate 411. The second plate 420 may include a second base substrate 421 and a second electrode 424 formed on the second base substrate 421. The first and second electrodes 414 and 424 may include a transparent conductive material such as indium tin oxide (ITO), indium zinc oxide (IZO), or the like.

A non-conductive layer patterned to accommodate a plurality of stepped structures may be disposed below either the first electrode 414 or the second electrode 424.

The liquid crystal layer 430 may include vertically aligned (VA) liquid crystal molecules. The first electrode 414 and the second electrode 424 may generate an electric field in the liquid crystal layer 430 according to applied voltages, thereby controlling an arrangement of liquid crystal molecules 431 of the liquid crystal layer 430.

The optical modulation device 400 may be operated in the 2D or the 3D mode according to voltages applied to the first electrode 414 and the second electrode 424. For example, the optical modulation device 400 may be operated in the 2D mode when no voltage is applied to the first electrode 414 and the second electrode 424. The optical modulation device 400 may be operated in the 3D mode when voltages are applied to the first electrode 414 and the second electrode 424.

Figure 5:
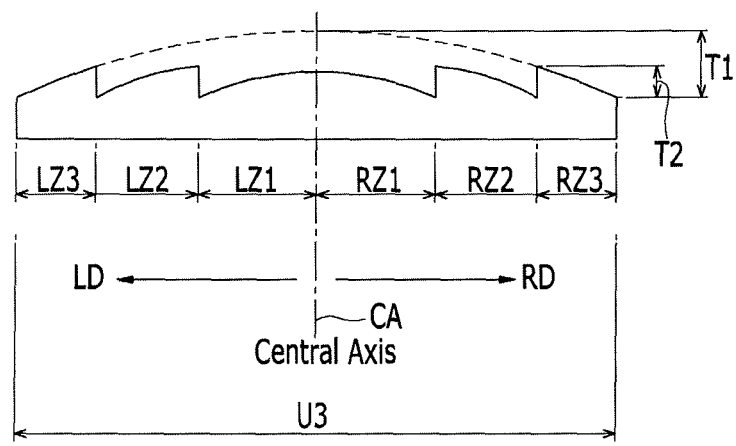
FIG. 5 is a drawing illustrating a shape of a unit element U3, illustrated in FIG. 3, and its phase retardation, according to an exemplary embodiment of the present invention.

FIG. 5 is a drawing illustrating a shape of the unit element U3, illustrated in FIG. 3, and its phase retardation, according to an exemplary embodiment of the present invention. Since respective shapes of the plurality of unit elements U1 to U5 may be identical, only the single unit element U3 will be described with reference to FIG. 5. Thus, a description of the unit elements U1, U2, U4, and U5 will be omitted.

The unit element U3 may produce the same phase shift as a Fresnel lens when the liquid crystal molecules 431 of the liquid layer 430 are tilted. Specifically, the unit element U3 implements the Fresnel lens by setting discrete points of the phase when an ideal phase delay surface to be implemented is divided by integer multiples of 2 times π (e.g., 2π) as a boundary. The Fresnel lens is a lens that may adopt a phase delay surface of a convex lens and have a second thickness T2 that is smaller than a first thickness T1. Therefore, a cell gap of the optical modulation device 400 that uses the Fresnel lens may be reduced to 1/K of a cell gap of the optical modulation device 400 that uses the convex lens. K is a natural number equal to n/2, where n is the number of circular arcs included in the Fresnel lens.

Each unit element U1, U2, U3, U5, and U5 may be split into a plurality of prism areas RZ1, RZ2, RZ3, LZ1, LZ2, and LZ3 by dividing the ideal phase delay surface. Right prism areas RZ1, RZ2, and RZ3 may be symmetrical to left prism areas based on a central axis CA.

The plurality of prism areas RZ1, RZ2, RZ3, LZ1, LZ2, and LZ3 may respectively have curvatures corresponding to a plurality of concentric circles and may become smaller in a direction away from the central axis CA.

For example, as shown in FIG. 5, widths of the right prism areas RZ1, RZ2, and RZ3, hereinafter referred to as pitches, may become smaller in a right direction RD away from the central axis CA, and pitches of the left prism areas LZ1, LZ2, and LZ3 may become smaller in a left direction LD, which is opposite to the right direction RD, away from the central axis CA.

In FIG. 5, according to an exemplary embodiment of the present invention, a unit element, for example, unit element U3, may have three prism areas to the left of the central axis CA and three prism areas to the right of the central axis CA. However, the present invention is not limited thereto. For example, more or less than three prism areas may be on each side of a central axis CA. The number of prisms may be changed according to various factors such as resolution or the like.

As shown in FIG. 5, each of the prism areas RZ1, RZ2, RZ3, LZ1, LZ2, and LZ3 of the unit elements U1 to U5 may have a shape through which phase retardation of light increases closer to the central axis CA. By having such shapes, each of the unit elements U1 to U5 may allow light passing through the unit elements U1 to U5 to be refracted such that the light may be focused on a focal point using diffraction, destructive interference, and constructive interference of light.

According to an exemplary embodiment of the present invention, the optical modulation device 400, configured to operate as a Fresnel zone plate, will now be described with reference to FIGS. 6 to 10. The optical modulation device 400 may be referred to as a switchable zone plate.

Figure 6:
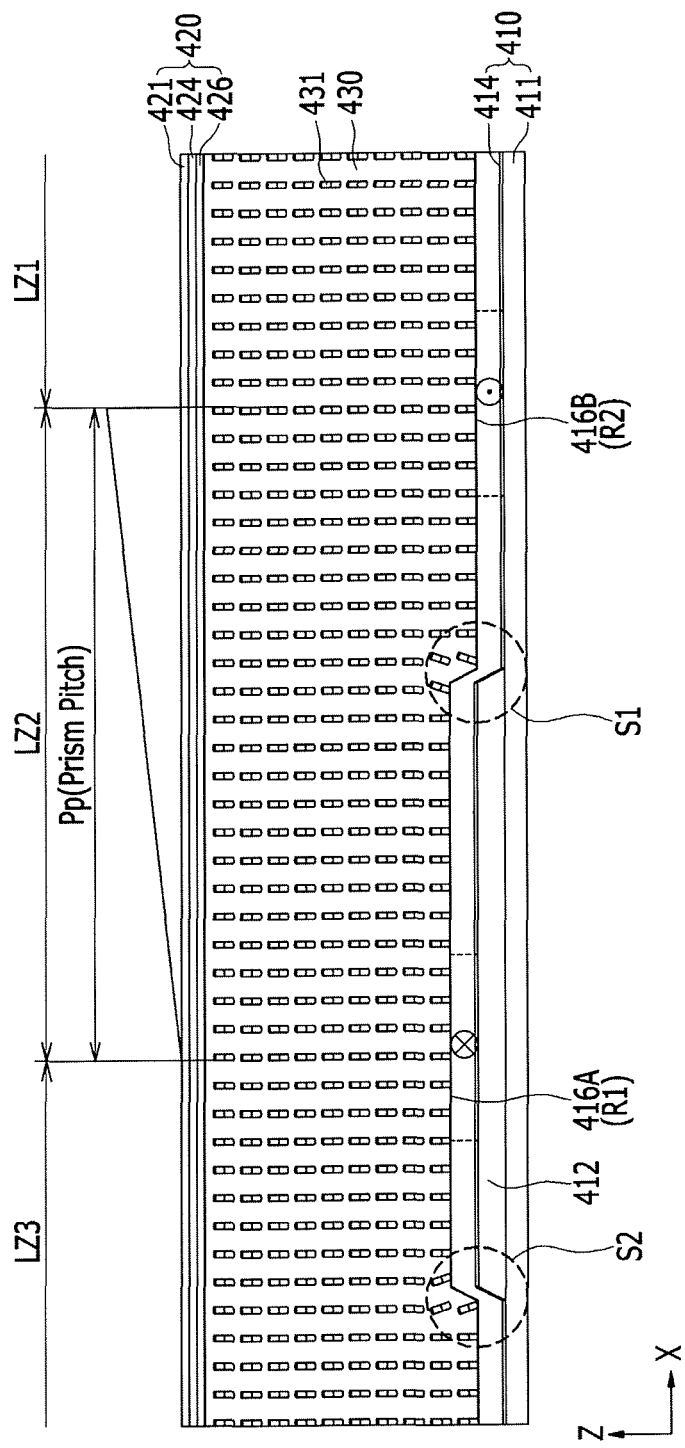
FIG. 6 is a partial cross-sectional view of an optical modulation device configured to operate as a Fresnel zone plate, according to an exemplary embodiment of the present invention.
Figure 7:
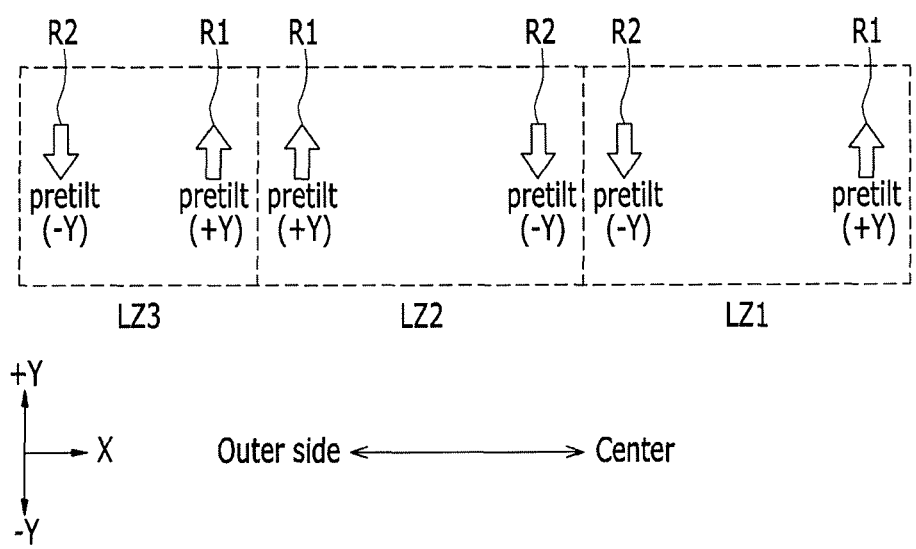
FIG. 7 is a drawing illustrating pretilt directions of the optical modulation device illustrated in FIG. 6, according to an exemplary embodiment of the present invention.
Figure 8:
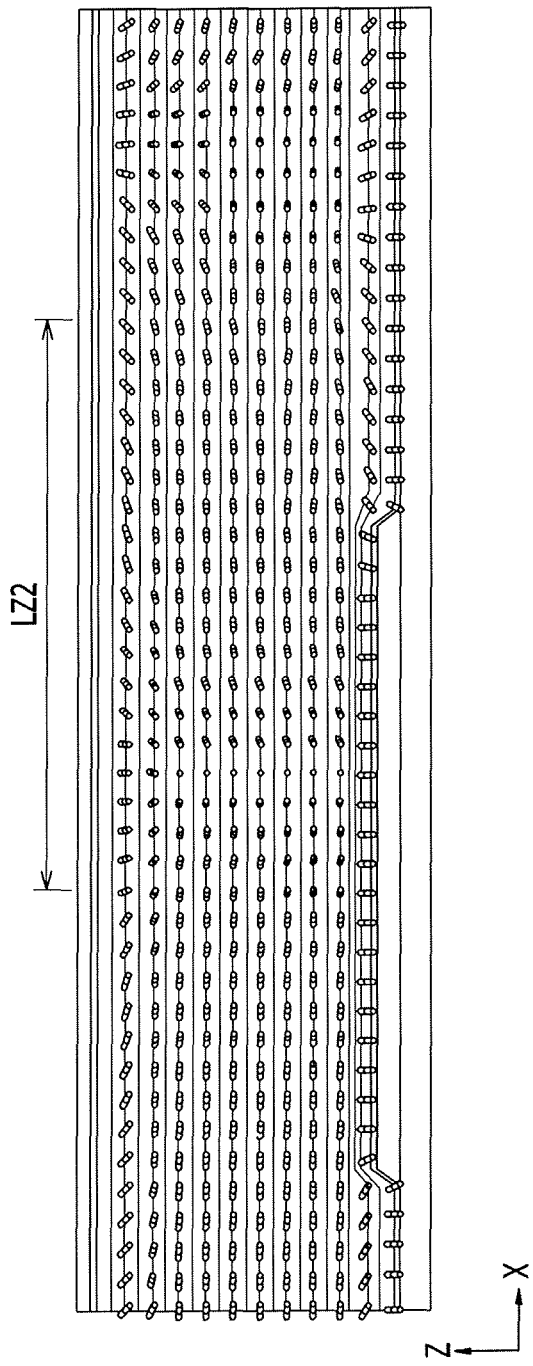
FIG. 8 illustrates an arrangement of liquid crystal molecules of a liquid crystal layer on an X-Z plane when the optical modulation device illustrated in FIG. 6 is operated in a 3D mode, according to an exemplary embodiment of the present invention.
Figure 9:
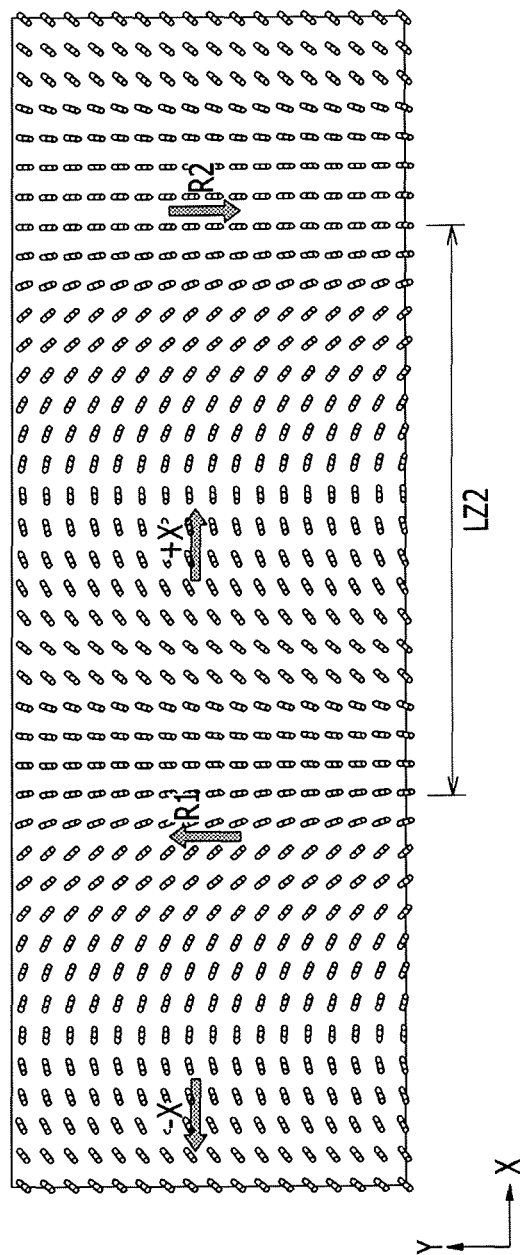
FIG. 9 illustrates an arrangement of the liquid crystal molecules of the liquid crystal layer on an X-Y plane when the optical modulation device illustrated in FIG. 6 is operated in the 3D mode, according to an exemplary embodiment of the present invention.

FIG. 6 is a partial cross-sectional view of an optical modulation device 400 configured to operate as a Fresnel zone plate, according to an exemplary embodiment of the present invention. FIG. 7 is a drawing illustrating pretilt directions of the optical modulation device illustrated in FIG. 6, according to an exemplary embodiment of the present invention. FIG. 8 illustrates an arrangement of the liquid crystal molecules 431 of the liquid crystal layer 430 on an X-Z plane when the optical modulation device illustrated in FIG. 6 is operated in the 3D mode, according to an exemplary embodiment of the present invention. FIG. 9 illustrates an arrangement of the liquid crystal molecules 431 of the liquid crystal layer 430 on an X-Y plane when the optical modulation device illustrated in FIG. 6 is operated in the 3D mode, according to an exemplary embodiment of the present invention.

FIGS. 6 to 9 illustrate the three prisms areas LZ1, LZ2, and LZ3 that are included to the left of the central axis CA in the unit elements of the optical modulation device 400. FIG. 6 illustrates a state of the optical modulation device 400 being operated in the 2D mode. FIGS. 8 and 9 illustrate a state of the optical modulation device 400 being operated in the 3D mode.

The first plate 410 includes the first base substrate 411, a non-conductive layer 412, and the first electrode 414. The non-conductive layer 412 includes a stepped structure having a predetermined pitch in the X-axis direction. The stepped structure of the non-conductive layer 412 may be provided by a plurality of non-conductive layers 412 that may be divided and patterned in a Y-axis direction and may be arranged in the X-axis direction to have the predetermined pitch. The non-conductive layers 412 are not be divided if the stepped structure having the predetermined pitch can be provided in the X-axis direction.

The first electrode 414 may be formed to partially cover the stepped structure of the non-conductive layer 412. To simplify a manufacturing process, the first electrode 414 may be formed as a patternless plate-shaped electrode across a first region that faces the liquid crystal layer 430.

The stepped structure may be formed across the two prism areas. For example, in FIG. 6, the stepped structure is disposed across the LZ3 and LZ2 prism areas. Widths of the stepped structures may gradually increase in a direction toward the central axis CA. Accordingly, the phase delays may increase closer to the central axis CA.

The second plate 420 may include the second electrode 424 that may be formed on the second base substrate 421 to face the first electrode 414. To simplify a manufacturing process, the second electrode 424 may also be formed as a patternless plate-shaped electrode across a second region that faces the liquid crystal layer 430. In the 2D mode, a reference voltage may be applied to the first electrode 414 and the second electrode 424. Accordingly, there is no voltage difference between the first electrode 414 and the second electrode 424. Since the liquid crystal layer 430 may be aligned in a vertically aligned (VA) mode, as shown in FIG. 6, the liquid crystal molecules 431 may be aligned in a normal direction (e.g., a Z-axis direction) of the first plate 410. Since substantially all the liquid crystal molecules 431 may be aligned in the Z-axis direction, phase delays in different locations of the optical modulation device 400 may be identical or nearly identical. For example, since there is no difference in the phase delays that result in different locations along the optical modulation device 400, the optical modulation device 400 does not perform a lens function but operates in the 2D mode.

Referring to FIGS. 6 and 7, within one prism area, a first aligner 416A may be aligned to be pretilted in a first direction R1, and a second aligner 416B may be aligned to be pretilted in a second direction R2. The first aligner 416A and the second aligner 416B may be disposed on the first electrode 414. As shown in FIG. 7, the first direction R1 may be a positive Y-axis direction, and the second direction R2 may be a negative Y-axis direction. The first aligner 416A and the second aligner 416B may have ranges according to the phase delays of the respective prisms LZ1, LZ2, and LZ3. The first aligner 416A and the second aligner 416B, respectively, may include a single alignment layer that is rubbed or photo-aligned in the first direction R1 and the second direction R2, respectively.

In the 3D mode, a first voltage, for example, a lens voltage, may be applied to the first electrode 414, and a reference voltage may be applied to the second electrode 424. The liquid crystal molecules 431 may lie down (e.g., be arranged or aligned) in the pretilt direction due to a voltage difference between the first electrode 414 and the second electrode 424. For example, with reference to FIG. 9, the liquid crystal molecules 431 disposed on the first aligner 416A may lie down in the positive Y-axis direction according to the pretilt direction (e.g., first direction R1), and the liquid crystal molecules 431 disposed on the second aligner 416B may lie down in the negative Y-axis direction according to the pretilt direction (e.g., second direction R2). Further, the liquid crystal molecules 431 disposed at a first lateral side S1 of the non-conductive layer 412, the non-conductive layer 412 having the stepped structure, may lie down in the positive X-axis direction, while the liquid crystal molecules 431 disposed at a second lateral side S2 may lie down in the negative X-axis direction.

As illustrated in FIGS. 8 and 9, when the first voltage, for example, the lens voltage, is applied to the first electrode 414 and the reference voltage is applied to the second electrode 424, the liquid crystal molecules 431 may be tilted substantially parallel to a surface of the first plate 410 or the second plate 420 to make an in-plane arrangement. In the in-plane arrangement, the long axes of the liquid crystal molecules 431 may be rotated and arranged in-plane (e.g., in a plane). In the in-plane arrangement, the long axes of the liquid crystal molecules 431 may be aligned parallel to the surface of the first plate 410 or the second plate 420, for example, in the X-Y plane. As the liquid crystal molecules 431 are rotated to be aligned (e.g., arranged) in a plane, the phase delays increase around the center of each prism. An optical modulation device, according to an exemplary embodiment of the present invention, configured to be operated as a Fresnel zone plate, will now be described with reference to FIGS. 10 to 12.

Figure 10:
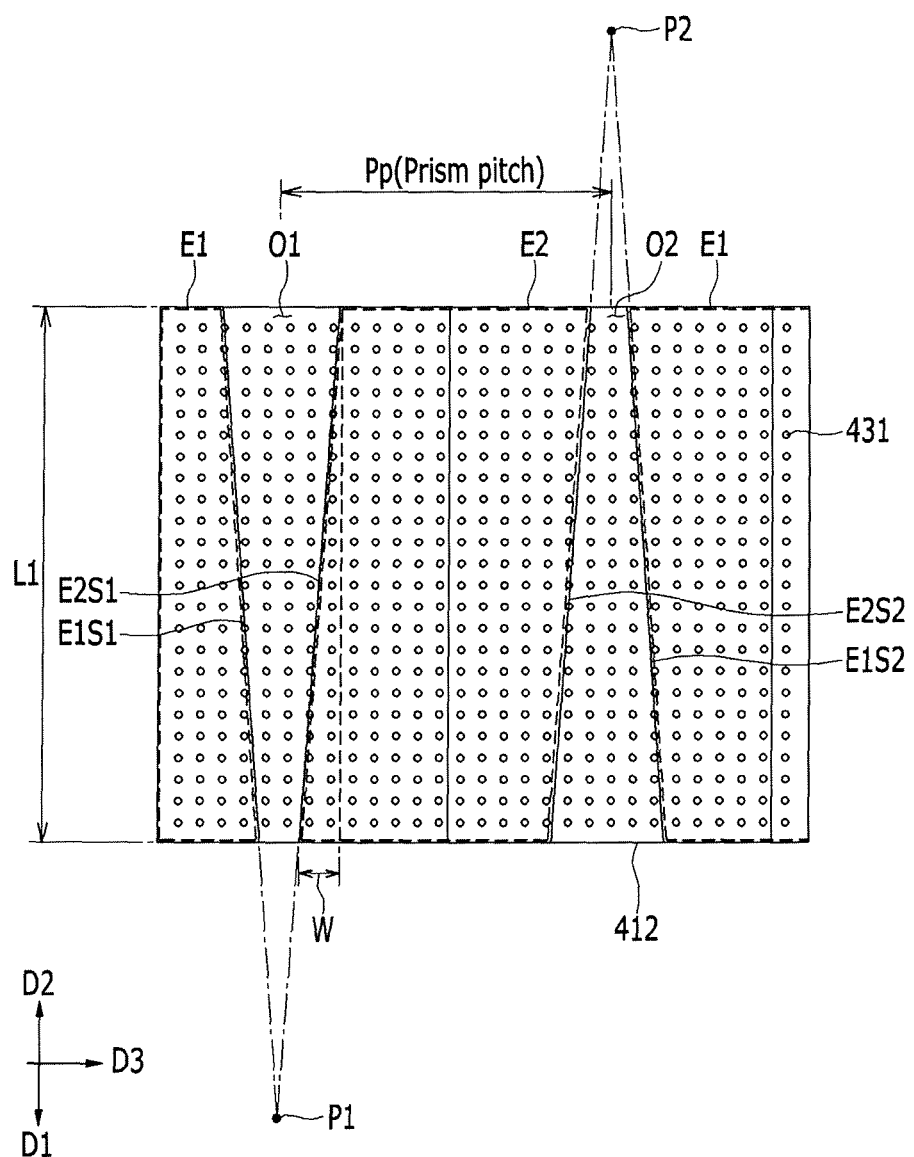
FIG. 10 is a top plan view of a first electrode and a non-conductive layer forming a stepped structure of an optical modulation device, according to an exemplary embodiment of the present invention.
Figure 11:
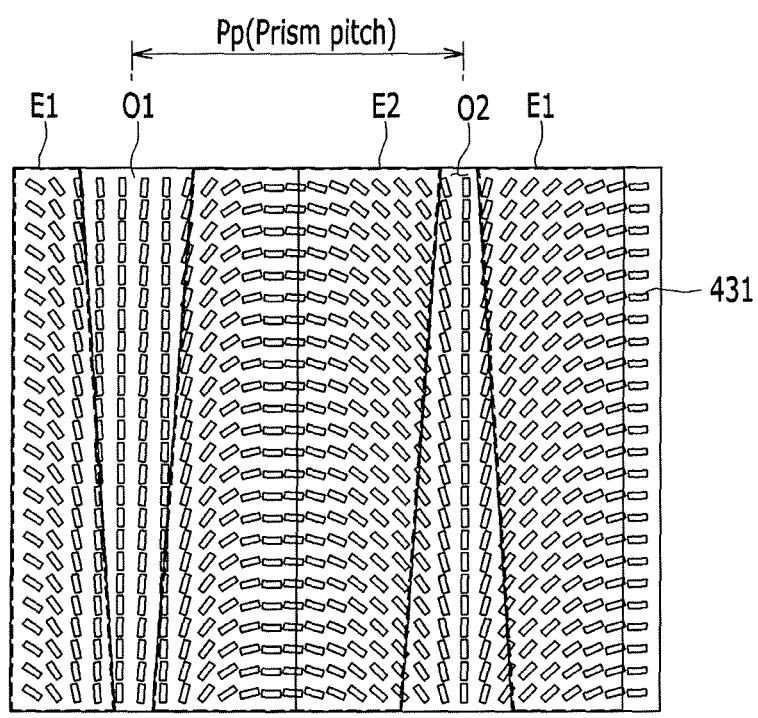
FIG. 11 is a top plan view of an optical modulation device like that shown in FIG. 10 when operated in the 3D mode, according to an exemplary embodiment of the present invention.
Figure 12:
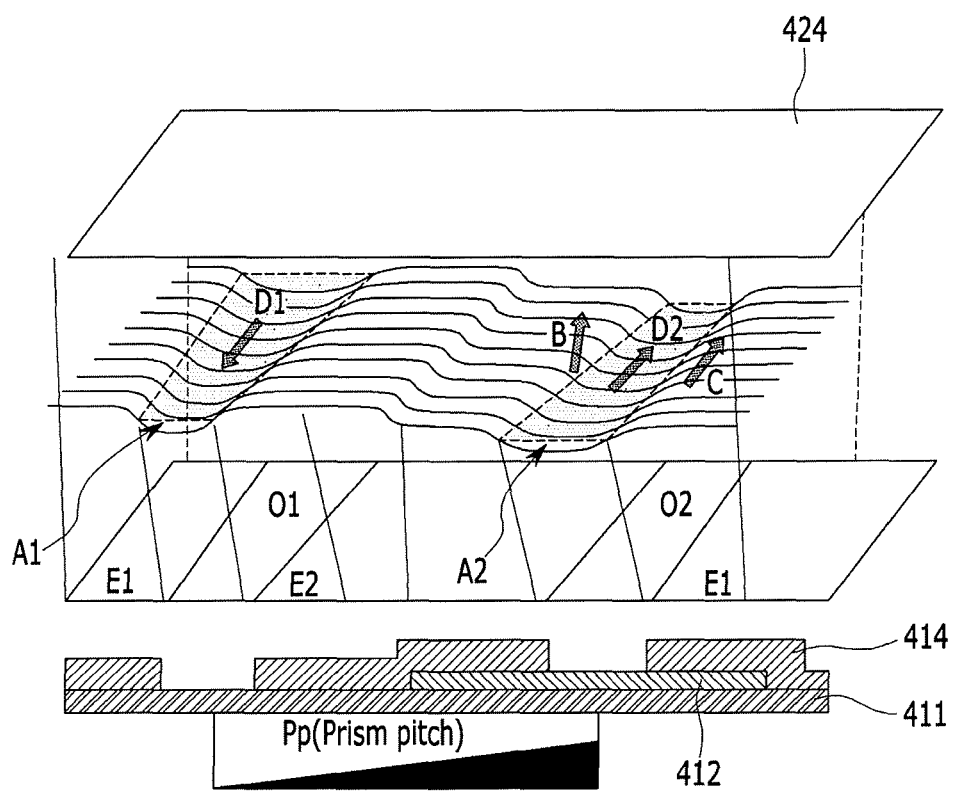
FIG. 12 is a schematic perspective view of an optical modulation device like that shown in FIG. 10 when operated in the 3D mode, according to an exemplary embodiment of the present invention.

In the optical modulation device illustrated in FIGS. 10 to 12, positive Y-axis alignment directions and negative Y-axis alignment directions of the liquid crystal molecules 431 may be controlled by defining shapes of a first electrode pattern E1 of the first electrode 414 and a second electrode pattern E2 of the first electrode 414. Positive X-axis alignment directions and negative X-axis alignment directions may be controlled by using the stepped structure of the non-conductive layer 412. Thus, a high-level periodical pre-tilt process for initial alignment of the liquid crystal molecules 431 may be omitted.

FIG. 10 illustrates a top plan view of the non-conductive layer 412 and the first electrode 414. The first electrode 414 may include the first and second electrode patterns E1 and E2. A first lateral side E1S1 of the first electrode pattern E1 and a first lateral side E2S1 of the second electrode pattern E2 may be tilted to converge at the first point P1. In addition, an interval (e.g., distance) between the first lateral side E1S1 of the first electrode pattern E1 and the first lateral side E2S1 of the second electrode pattern E2 may become smaller toward a first direction D1.

A second lateral side E1S2 of the first electrode pattern E1 and a second lateral side E2S2 of the second electrode pattern E2 may be tilted to converge at a second point P2. In addition, an interval between the second lateral side E1S2 of the first electrode pattern E1 and the second lateral side E2S2 of the second electrode pattern E2 may become smaller toward the second direction D2.

Accordingly, both of the lateral sides E1S1 and E1S2 of the first electrode pattern E1 may have a negative slope with respect to the X-axis (e.g., D3 direction), and both of the lateral sides E2S1 and E2S2 of the second electrode pattern E2 may have a positive slope with respect to the X-axis (e.g., D3 direction).

Gradients of the first and second electrode patterns E1 and E2 (e.g., slopes of the first and second electrode patterns E1 and E2) may be defined as W/L. When the slope of the first and second electrode patterns E1 and E2 (e.g., W/L) is approximately equal to about 1/600 or less, the liquid crystals between the first and second electrode patterns E1 and E2 might not be normally aligned. Accordingly, the slope (e.g., W/L) may be set to be greater than about 1/600 and to have values in a range for allowing the liquid crystals to be normally aligned.

An opening O1 between the first lateral side E1S1 of the first electrode pattern E1 and the first lateral side E2S1 of the second electrode pattern E2 may have an area equal to one-half to one multiplied by a sum of areas of the first and second electrode patterns E1 and E2. An opening O2 between the second lateral side E1S2 of the first electrode pattern E1 and the second lateral side E2S2 of the second electrode pattern E2 may have an area equal to one-half to one multiplied by a sum of areas of the first and second electrode patterns E1 and E2.

As illustrated in FIG. 10, when no voltage is applied to the first and second electrodes 414 and 424, the liquid crystal molecules 431 are aligned perpendicular to the surface of the first plate 410 or the second plate 420, (e.g., in a VA mode).

As shown in FIGS. 11 and 12, a driving voltage for the 3D mode may be applied to the first and second electrodes 414 and 424 so the liquid crystal molecules 431 may be aligned along an equipotential surface that may be formed by the first and second electrode patterns E1 and E2. Thus, the liquid crystal molecules 431 may be aligned in the positive Y-axis direction and the negative Y-axis direction. In addition, the liquid crystal molecules 431 may be aligned in the positive X-axis direction and the negative X-axis direction by the stepped structure of the non-conductive layer 412.

When a common voltage is applied to the second electrode 424 and a lens voltage is applied to the first and second electrode patterns E1 and E2 of the first electrode 414, the first and second electrode patterns E1 and E2 may receive a driving voltage of the same potential such that the equipotential surface may be disposed between the first electrode pattern E1 and the second electrode 424, and between the second electrode pattern E2 and the second electrode 424.

A region between the first and second electrode patterns E1 and E2, such as the first opening O1 may have a trapezoidal shape that becomes smaller toward the first direction D1. The region corresponding to the first opening O1 may have an equipotential surface A1 that may have a lower height than a region corresponding to the first and second electrode patterns E1 and E2 and may have a trapezoidal shape. In addition, a region between the first and second electrode patterns E1 and E2 such as the second opening O2 may have a trapezoidal shape that becomes smaller along the second direction D2. The region corresponding to the second opening O2 may have an equipotential surface A2. The equipotential surface A2 may have a smaller width than a width corresponding to a region of the first and second electrode patterns E1 and E2. The equipotential surface A2 may have a trapezoidal shape.

Accordingly, the liquid crystal molecules 431 may lie down toward the first direction D1 by the equipotential surface A1 formed in the first opening O1, and toward the second direction D2 by the equipotential surface A2 formed in the second opening O2.

In addition, the liquid crystal molecules 431, which may be disposed at the first lateral side S1 of the non-conductive layer 412, the non-conductive layer 412 having the stepped structure, may lie down in the positive X-axis direction. The liquid crystal molecules 431 disposed at the second lateral side S2 may lie down in the negative X-axis direction.

Figure 13:
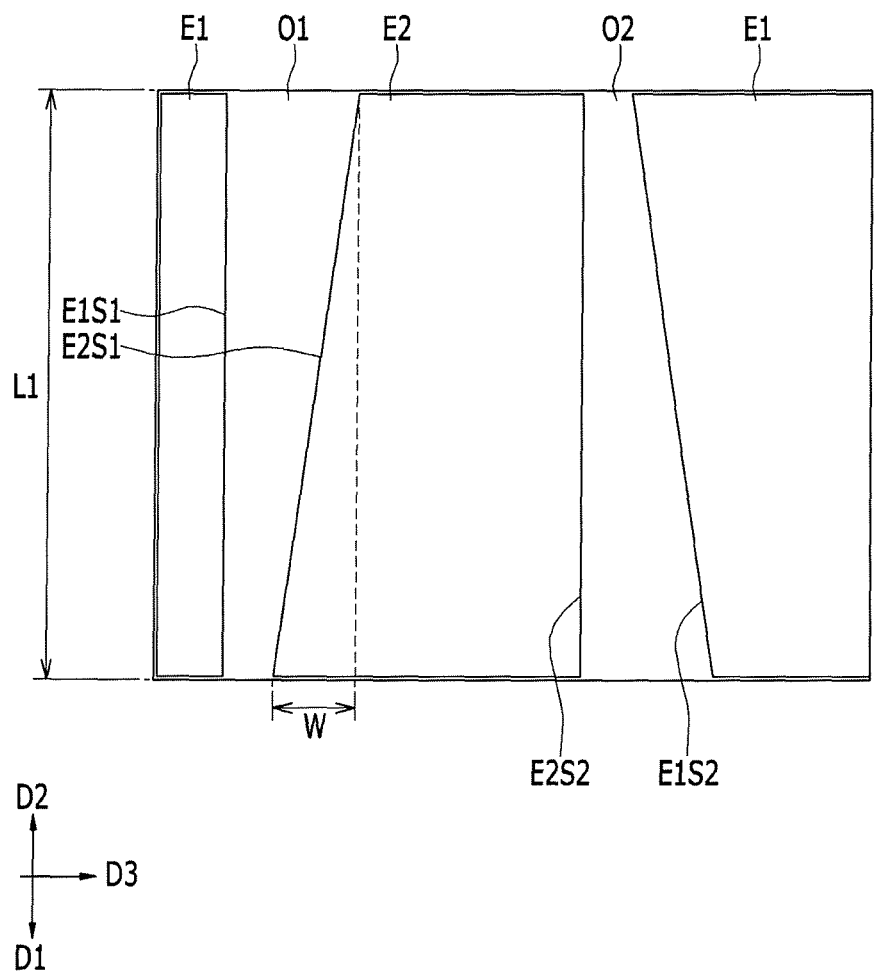
FIGS. 13, 14 and 15 are top plan views of various modifications of a first electrode pattern and a second electrode pattern, according to exemplary embodiments of the present invention.
Figure 14:
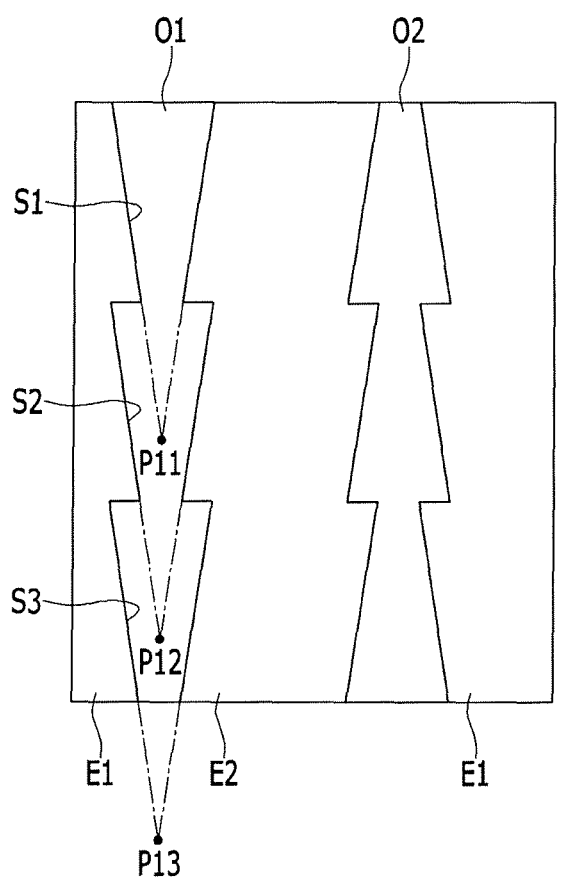
Figure 15:
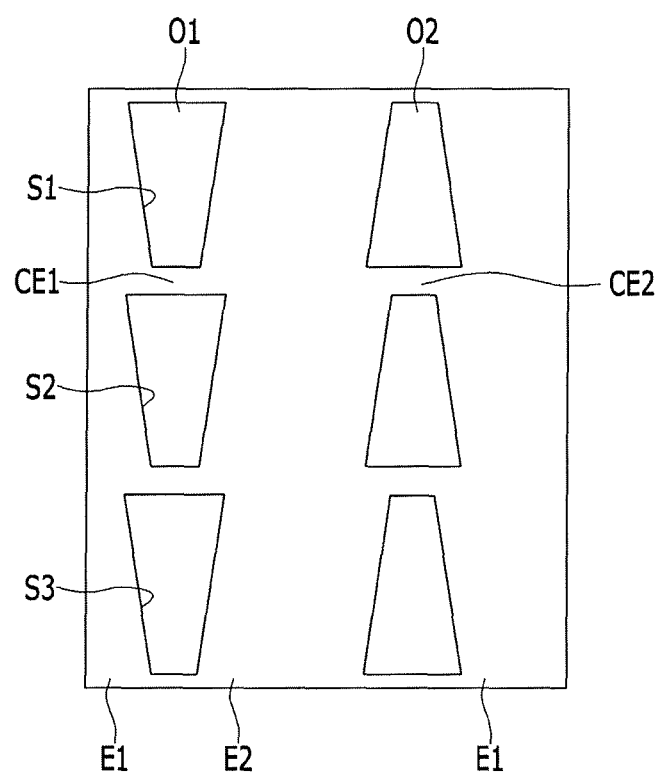

FIGS. 13, 14 and 15 are top plan views of various modifications of a first electrode pattern E1 and a second electrode pattern E2, according to exemplary embodiments of the present invention. The same components illustrated in FIG. 10 may also be illustrated in FIGS. 13, 14 and 15 using the same reference numerals. Thus, a detailed description of the components described with reference to FIG. 10 will be omitted for brevity.

Referring to FIG. 13, one of the lateral sides of the first electrode pattern E1 (e.g., E1S1) may be substantially perpendicular to the direction D3. Another side of the first electrode E1 (e.g., E1S2) may be oblique. One of the lateral sides of the second electrode pattern E2 (e.g., E2S2) may be a line substantially perpendicular to the direction D3. Another side of the second electrode E2 (e.g., E2S1) may be oblique. For example, the first lateral side E1S1 of the first electrode pattern E1 may be formed as a straight line substantially perpendicular to the direction D3, and a second lateral side E1S2 of the first electrode pattern E1 may be formed as an oblique line with respect to the first lateral side E1S1. A second lateral side E2S2 of the second electrode pattern E2 may be formed as a straight line substantially perpendicular to the direction D3, and a first lateral side E2S1 of the second electrode pattern E2 may be formed as an oblique line with respect to the second lateral side E2S2. The lateral side E1S2 of the first electrode pattern E1 may have a negative slope with respect to the X-axis (e.g., D3 direction), while the lateral side E2S1 of the second electrode pattern E1 may have a positive slope with respect to the X-axis (e.g., D3 direction). Accordingly, a first opening O1 may have a trapezoidal shape that may become smaller toward the first direction D1, while the second opening O2 may have a trapezoidal shape that may become smaller toward the second direction D2. In this case, a slope (e.g., W/L) of each of the oblique lines of the second lateral side E1S2 and the second lateral side E2S1 may be set in a range of about 1/100 to about 2/100. The first opening O1 may have an area corresponding to one half to one multiplied by a sum of areas of the first and second electrodes E1 and E2. The second opening O2 may have an area corresponding to one half to one multiplied by a sum of areas of the first and second electrodes E1 and E2.

Referring to FIG. 14, the lateral sides of the first and second electrode patterns E1 and E2 may include a plurality of inclined portions S1, S2, and S3, and each of the inclined portions may converge at each of the convergence points P11 to P13, respectively.

Referring to FIG. 15, the first and second electrode patterns E1 and E2 may be connected through a plurality of first and second connecting electrodes CE1 and CE2 such that the first opening O1 may have a trapezoidal shape having a smaller width toward the first direction D1. The second opening O2 may have a trapezoidal shape having a smaller width toward the second direction D2.

Respective pitches of refraction regions RZ1, RZ2, RZ3, LZ1, LZ2, and LZ3 may increase as they get closer to the central axis CA. In this case, widths of the first and second electrode patterns E1 and E2 may also increase in a direction toward the central axis CA.

Measured results of light deflection angles for prism pitches of an optical modulation device according to an exemplary embodiment of the present invention are shown in Table 1 below.

TABLE 1

| Prism pitch (μm) | Light deflection angle (°) | Average refraction efficiency (%) |
| --- | --- | --- |
| 4 | 7.90 | 96.0 |
| 8 | 3.94 | 96.5 |
| 16 | 1.97 | 96.0 |

According to the results of Table 1, the light deflection angles may be increased as the prism pitches becomes shorter. Compared with a case in which a ±Y-axis direction alignment and an ±X-axis direction alignments are adjusted only by electrode patterns, without performing a periodic pretilt process, the same minute electrode pattern-processing capability (e.g., shaping the second electrode 420, and shaping the first and second electrode patterns E1 and E2 as described above with reference to FIGS. 10 to 15) may double the prism pitches when compared with the case in which the alignments are adjusted only by the electrode patterns. This is because the optical modulation device illustrated in FIGS. 10 to 15 may realize the ±X-axis direction alignment using the non-conductive layer 412 having the stepped structure, and may realize the ±Y-axis direction alignment using the electrode patterns which may be patterned as shown above with reference to FIGS. 10 to 15. For example, when the same minute pattern-processing capability is applied, a prism pitch may be 8 μm when ±Y-axis direction alignment and the ±X-axis direction alignment are adjusted only by the electrode patterns (e.g., the second electrode 420 and the first and second electrode patterns E1 and E2). However, the optical modulation device illustrated in FIGS. 10 to 15, using the non-conductive layer 412 having the stepped structure, may reduce the prism pitch to 4 μm. Thus, for example, the light deflection angle of 3.94° may be increased to 7.90°.

According to the exemplary embodiment of the present invention, in the optical modulation device including the liquid crystals, the in-plane rotation angle of the liquid crystal molecules can be adjusted to modulate the phase of the light and the driving scheme can be simplified. In addition, the manufacturing process of the optical modulation device including the liquid crystals can be simplified and diffraction efficiency of the optical modulation device can be increased.

While the present invention has been described with reference to exemplary embodiments thereof, it is to be understood that the present invention is not limited to the disclosed exemplary embodiments. The present invention may cover various modifications and equivalent arrangements of the exemplary embodiments thereof without departing from the scope of the present invention, as defined in the claims.

What is claimed is:

1. An optical modulation device comprising:
    first and second plates facing each other, the first and second plates including a plurality of regions; and
    a liquid crystal layer interposed between the first and second plates, the liquid crystal layer including liquid crystal molecules aligned in a vertical alignment (VA) mode,
    wherein the first plate includes
    a non-conductive layer including stepped structures repeatedly arranged in a first direction,
    a first electrode formed to partially cover the non-conductive layer, and
    first and second aligners disposed in a second direction different from the first direction, wherein the first and second aligners are aligned in opposite directions with respect to each other, and
    wherein the second plate includes a second electrode.

2. The optical modulation device of claim 1, wherein, when an electric field is applied, a first lateral side of at least one of the stepped structures aligns the liquid crystal molecules in a positive first direction, and a second lateral side of the at least one stepped structure aligns the liquid crystal molecules in a negative first direction.

3. The optical modulation device of claim 2, wherein the first aligner aligns the liquid crystal molecules in a positive second direction and the second aligner aligns the liquid crystal molecules in a negative second direction.

4. The optical modulation device of claim 1, wherein the first electrode is a patternless plate-shaped electrode and is disposed in a region of the first plate that faces the liquid crystal layer.

5. The optical modulation device of claim 1, wherein the second electrode is a patternless plate-shaped electrode and is disposed in a region of the second plate that faces the liquid crystal layer.

6. The optical modulation device of claim 1, wherein, when operated in a two-dimensional (2D) mode, a reference voltage is applied to the first and second electrodes.

7. The optical modulation device of claim 1, wherein, when operated in a three-dimensional (3D) mode, a lens voltage is applied to the first electrode and a common voltage is applied to the second electrode.

8. The optical modulation device of claim 7, wherein, when operated in the 3D mode, the lens voltage and the common voltage are applied to rotate and align long axes of the liquid crystal molecules in a plane.

9. An optical modulation device comprising:
    first and second plates facing each other, the first and second plates including a plurality of regions; and
    a liquid crystal layer interposed between the first and second plates, the liquid crystal layer including liquid crystal molecules aligned in a vertical alignment (VA) mode,
    wherein the first plate includes
    a non-conductive layer including stepped structures repeatedly arranged in a first direction, and
    a first electrode formed to partially cover the non-conductive layer,
    wherein the second plate includes a second electrode, and
    wherein the first electrode includes first and second electrode patterns, wherein a first lateral side of the first electrode pattern faces a first lateral side of the second electrode pattern, and wherein the first lateral side of the first electrode pattern converges with the first lateral side of the second electrode pattern on a point in a second direction that crosses the first direction.

10. The optical modulation device of claim 9, wherein, when an electric field is applied, a first lateral side of at least one of the stepped structures aligns the liquid crystal molecules in a positive first direction, and a second lateral side of the at least one stepped structure aligns the liquid crystal molecules in a negative first direction.

11. The optical modulation device of claim 9, wherein the first electrode pattern covers a first lateral side of the at least one stepped structure, and the second electrode pattern covers a second lateral side of the at least one stepped structure.

12. The optical modulation device of claim 9, wherein one of each of the first and second electrode patterns are included in a unit, wherein a plurality of units are repeatedly arranged on the first plate, and wherein a first opening between a first electrode pattern of a first unit and a second electrode pattern of the first unit has a shape that becomes narrower toward a negative second direction, and a second opening between the second electrode pattern of the first unit and a first electrode pattern of a second unit has a shape that becomes narrower toward a positive second direction.

13. The optical modulation device of claim 12, wherein at least a lateral side, from among the plurality of lateral sides of the first electrode pattern of the first unit, has a negative slope with respect to the first direction, and at least a lateral side, from among the plurality of lateral sides of the second electrode pattern of the first unit, has a positive slope with respect to the first direction.

14. The optical modulation device of claim 12, wherein a first lateral side of the first electrode pattern of the first unit has a negative slope with respect to the first direction, and a first lateral side of the second electrode pattern of the first unit has a positive slope with respect to the first direction.

15. The optical modulation device of claim 12, wherein a first lateral side of the first electrode pattern of the first unit is perpendicular to the first direction, and a second lateral side of the second electrode pattern of the first unit is perpendicular to the first direction.

16. The optical modulation device of claim 12, wherein the a first lateral side of the first electrode pattern of the first unit faces a second lateral side of the second electrode pattern of the first unit, wherein the first and second lateral sides of the first and second electrode patterns of the first unit converge at a plurality of first points, and the first and second lateral sides of the first and second electrode patterns of the first unit include a plurality of inclined portions that are inclined with respect to the first direction.

17. The optical modulation device of claim 12, wherein a connecting electrode is provided between the first and second electrode patterns of the first unit to electrically connect the first and second electrode patterns of the first unit, and each of the first and second openings include a plurality of third openings formed by the connecting electrode.

18. The optical modulation device of claim 9, wherein, when operated in a two-dimensional (2D) mode, a reference voltage is applied to the first and second electrodes.

19. The optical modulation device of claim 9, wherein, when operated in a three-dimensional (3D) mode, a lens voltage is applied to the first electrode and a common voltage is applied to the second electrode.

20. The optical modulation device of claim 19, wherein, when operated in the 3D mode, the lens voltage and the common voltage are applied to rotate and align long axes of the liquid crystal molecules in a plane.

* * * * *